US012394840B2

(12) United States Patent
Bonauer et al.

(10) Patent No.: US 12,394,840 B2
(45) Date of Patent: Aug. 19, 2025

(54) SUPPORT DEVICE FOR AN ELECTRICAL ENERGY STORE HAVING AN ISOLATION STRIP, AND ELECTRICAL ENERGY STORE

(71) Applicant: Bayerische Motoren Werke Aktiengesellschaft, Munich (DE)

(72) Inventors: Franz Bonauer, Unterschleissheim (DE); Martin Spaeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 493 days.

(21) Appl. No.: 17/990,830

(22) Filed: Nov. 21, 2022

(65) Prior Publication Data

US 2023/0158973 A1    May 25, 2023

(30) Foreign Application Priority Data

Nov. 25, 2021    (DE) ...................... 10 2021 130 869.0

(51) Int. Cl.
*H01M 10/658*        (2014.01)
*H01M 10/6561*       (2014.01)
(Continued)

(52) U.S. Cl.
CPC ..... *H01M 10/658* (2015.04); *H01M 10/6561* (2015.04); *H01M 50/249* (2021.01);
(Continued)

(58) Field of Classification Search
None
See application file for complete search history.

(56) References Cited

U.S. PATENT DOCUMENTS

2020/0384842 A1* 12/2020 Qin ................. B62D 25/20

FOREIGN PATENT DOCUMENTS

DE    10 2020 106 780 A1    9/2021
DE    10 2020 116 087 A1    12/2021
(Continued)

OTHER PUBLICATIONS

German-language Office Action issued in German Application No. 10 2021 130 869.0 dated Aug. 30, 2022 (nine (9) pages).

*Primary Examiner* — Gregg Cantelmo
(74) *Attorney, Agent, or Firm* — Crowell & Moring LLP

(57) ABSTRACT

A support device for an electrical energy store for arrangement in a storage housing between at least two storage modules of the electrical energy store and for holding the storage modules, which can be fastened to both sides of the support device in the transverse direction, in the storage housing, includes: a beam for fastening to the storage housing, having a bearing face on which holding elements of the storage modules are to be placed; a clamping strip for arrangement on the bearing face of the beam and for clamping the holding elements of the storage modules; and fasteners for fastening the clamping strip to the beam. In an upper side of the clamping strip there are formed depressions which are arranged spaced apart from one another in the longitudinal direction of the support device and which are configured to receive the fasteners. The depressions form continuous channels in the transverse direction. An isolation strip is to be arranged on the upper side of the clamping strip and is designed to close the channels in order to prevent a thermal event of one storage module from being transmitted to another storage module located opposite in the transverse direction. The strip has two side parts which extend in the longitudinal direction and cover the depressions at the sides, and cover regions which cover the depressions on the upper side.

10 Claims, 5 Drawing Sheets

(51) Int. Cl.
*H01M 50/249* (2021.01)
*H01M 50/262* (2021.01)
*H01M 50/264* (2021.01)

(52) U.S. Cl.
CPC ....... *H01M 50/262* (2021.01); *H01M 50/264* (2021.01); *H01M 2220/20* (2013.01)

(56) References Cited

FOREIGN PATENT DOCUMENTS

| | | | |
|---|---|---|---|
| DE | 10 2020 129 785 A1 | 5/2022 | |
| JP | 2012-84239 A | 4/2012 | |
| WO | WO-2018033880 A2 * | 2/2018 | ............... B60K 1/04 |

* cited by examiner

SUPPORT DEVICE FOR AN ELECTRICAL ENERGY STORE HAVING AN ISOLATION STRIP, AND ELECTRICAL ENERGY STORE

CROSS REFERENCE TO RELATED APPLICATION

This application claims priority under 35 U.S.C. § 119 from German Patent Application No. 10 2021 130 869.0, filed Nov. 25, 2021, the entire disclosure of which is herein expressly incorporated by reference.

BACKGROUND AND SUMMARY

The invention relates to a support device for an electrical energy store for arrangement in a storage housing between at least two storage modules of the electrical energy store and for holding the storage modules, which can be fastened to both sides of the support device in the transverse direction, in the storage housing.

The support device comprises a beam for fastening to the storage housing, having a bearing surface on which holding elements of the storage modules, which can be arranged on both sides of the beam, are to be placed. The support device additionally comprises a clamping strip for arrangement on the bearing face of the beam and for clamping the holding elements of the storage modules. The support device further comprises fastening devices for fastening the clamping strip to the beam. In an upper side of the clamping strip there are formed depressions which are arranged spaced apart from one another in the longitudinal direction of the support device and which are to receive the fastening devices, wherein the depressions form continuous channels in the transverse direction. The invention relates additionally to an electrical energy store.

In the present case, interest is focused on electrical energy stores which can be used, for example, as traction batteries for electrified motor vehicles, that is to say electric or hybrid vehicles. Such electrical energy stores conventionally have a storage housing in which a plurality of storage modules are arranged. In order to hold the storage modules in the storage housing, elongate support devices having beams and clamping strips fastened to the beams by means of fastening devices can be provided. The support devices are fastened, for example, to a housing base of the storage housing. Storage modules are arranged and held on both sides of the support devices in the transverse direction of the support devices. A housing cover of the storage housing can be arranged so that it lies against a surface of the support device.

It may thereby be that an upper side of the clamping strip is profiled for receiving the fastening devices such that continuous channels in the transverse direction are formed. Such channels can provide undesirable thermal coupling between the storage modules arranged on both sides of the support devices, for example in that a thermal event of one of the storage modules is transmitted to another storage module by heat and particle transfer via one of the channels. Depending on the voltage difference, the surrounding installation space boundary conditions and other influencing factors, this can lead to an undesirable thermal event of the electrical energy store.

The object of the present invention is to at least reduce a thermal coupling between storage modules of an electrical energy store.

This object is achieved according to the invention by a support device and by an electrical energy store having the features according to the respective independent patent claims. Advantageous embodiments of the invention are the subject-matter of the dependent patent claims, the description and the figures.

A support device according to the invention for an electrical energy store serves for arrangement in a storage housing between at least two storage modules of the electrical energy store and for holding the storage modules, which can be fastened to both sides of the support device in the transverse direction, in the storage housing. The support device has a beam for fastening to the storage housing. The beam has a bearing face on which holding elements of the storage modules, which can be arranged on both sides of the beam, are to be placed. The support device additionally comprises a clamping strip for arrangement on the bearing face of the beam and for clamping the holding elements of the storage modules. The support device further has fastening devices for fastening the clamping strip to the beam. In an upper side of the clamping strip there are formed depressions which are arranged spaced apart from one another in the longitudinal direction of the support device and which are to receive the fastening devices, which depressions form continuous channels in the transverse direction. The support device additionally comprises an isolation strip which is to be arranged on the upper side of the clamping strip and which is designed to close the channels in order to prevent a thermal event of one storage module from being transmitted to another storage module located opposite in the transverse direction. To this end, the isolation strip has cover regions which cover the depressions on the upper side, and two side parts which extend in the longitudinal direction and cover the depressions at the sides.

The invention relates additionally to an electrical energy store for a motor vehicle, having a storage housing which has a housing base and a housing cover. The electrical energy store additionally has at least two storage modules, wherein each storage module has at least one holding element. The energy store additionally comprises at least one support device according to the invention, wherein the storage modules are arranged next to the support device on both sides in the transverse direction of the support device, and the holding elements of the storage modules are clamped between the beam and the clamping strip fastened to the beam by means of the fastening devices. The beam is fastened to the housing base of the storage housing, and the housing cover is arranged so that it lies against the upper side of the clamping strip in the region remote from the depressions.

The electrical energy store is in particular a high-voltage energy store and functions as a traction battery for an electrified motor vehicle. The storage modules have a plurality of storage cells, which are arranged and connected in a cell assembly. The storage cells can be, for example, prismatic battery cells which are stacked in a stacking direction to form a cell assembly in the form of a cell stack. The storage cells can also be in the form of round cells or pouch cells. The cell assembly of a respective storage module can be arranged in a cell module frame which has holding elements. The holding elements can be in the form of, for example, lugs protruding laterally from a tension rod, extending in the stacking direction, of the cell module frame.

In order to fasten the storage modules in the storage housing, elongate support devices are provided. It is thereby possible, for example, for a support device to be arranged between at least two storage modules such that a longitudinal direction of the support device is oriented in the stacking direction. The support devices each have a strip-like, elongate beam which is fastened to the housing base, for example by welding. In the state in which the energy store is arranged in the motor vehicle, the beams can extend in a vehicle transverse direction, so that the beams are in the form of cross-beams. For example, the beams can be elongate support profiles which have a strip-shaped bearing face and two strip-shaped side faces located opposite one another in the transverse direction. At least one storage module is in each case arranged adjacent to one of the side faces, wherein the associated holding elements are placed on the strip-shaped bearing face.

In order to fasten the storage modules to the support device, the support device additionally has the elongate clamping strip which is arranged to overlap the bearing face of the beam and is thus arranged above the beam in the vertical direction. The clamping strip can be in the form of a hollow profile element. The clamping strip is thereby profiled such that its upper side forms elevations and depressions. For example, the upper side of the clamping strip can have a profile that is rectangular in longitudinal section. Fastening devices, in particular screws, are arranged in the region of the depressions, in order to fasten the clamping strip to the beam. The upper side of the clamping strip thereby forms, in the region of the depressions, bearing faces for screw heads of the screws, wherein the screw heads in particular do not project beyond the elevations. The housing cover of the storage housing can thus be arranged so that it lies against the upper side of the clamping strip in the region of the elevations. Because the depressions are continuous in the transverse direction, they form channels between the storage modules arranged at the sides of the support device.

In order to prevent heat and/or particles released by a thermal event of one storage module, for example as a result of an intracell short circuit of one storage cell of the storage module, from passing through the channels to the adjacent storage module(s) and likewise triggering a thermal event there, the support devices have isolation strips. The isolation strips are designed to close the channels. To this end, the isolation strips are formed at least in part of a heat-resistant material. For example, the isolation strips are in the form of aluminum or steel sheets, in particular pre-galvanized aluminum or steel sheets.

The isolation strips have the side parts, which are, for example, strip-shaped. The side parts extend in the longitudinal direction and in the vertical direction and are located opposite one another in the transverse direction. In the state in which the isolation strip is arranged on the clamping strip, the side parts cover accesses, arranged opposite one another in the transverse direction, of the channels. The isolation strips additionally have the cover regions, which are arranged spaced apart from one another in the longitudinal direction and, in the state in which the isolation strip is arranged on the clamping strip, overlap the upper side of the clamping strip in the region of the depressions. By means of the cover regions of the isolation strip, the channels of the clamping strip are also covered at the top. In portions which comprise the cover regions, the isolation strip is thus in the form of a U-shaped profile. The isolation strip can have, for example, a cover part which has window-like apertures arranged spaced apart from one another in the longitudinal direction. These apertures are arranged on the upper side of the clamping strip in the region of the elevations. Portions of the cover part that are remote from the apertures form the cover regions. Preferably, the isolation strip is in the form of a stamped and bent sheet-metal part. By means of an isolation strip of such a form, a surface of the support device is formed by the upper-side regions of the clamping strip and by the cover regions of the isolation strip, which are arranged in alternation with one another in the longitudinal direction. In the state in which the isolation strip is arranged on the clamping strip, a height of the cover regions is in particular smaller than a height of the upper side of the clamping strip remote from the depressions. It can thus be ensured that the housing cover of the storage housing can be fitted to the upper side of the clamping strip.

Such an isolation strip, which can be arranged on the clamping strip as an additional component, can in a simple manner at least reduce a thermal coupling between storage modules. In addition, such an isolation strip can be provided with a low weight and installation space requirement and is simple to mount.

In a further development of the invention, at least two pressing pads for pressing the isolation strip against the clamping strip to form a force-based connection are arranged at least in part on the cover regions of the isolation strip. For fastening the isolation strip to the clamping strip, the isolation strip is pressed against the clamping strip. The pressing force is thereby provided by the housing cover, which is arranged on the upper side of the clamping strip. The pressing pads are formed of a resilient material and protrude from the upper side of the clamping strip as long as the housing cover is not arranged on the upper side of the clamping strip. The housing cover is arranged such that it lies against the upper side of the clamping strip in the region of the elevations. The resilient material is thereby compressed and presses the isolation strip against the clamping strip. The isolation strip can thus be fixed in a simple manner by means of force-based engagement.

Alternatively or additionally, the isolation strip has snap hooks for forming a snap connection with the clamping strip. The snap hooks can be integrated into the side parts, for example, and can protrude in the vertical direction. For example, the snap hooks can be integrated in a portion of the side parts in the region of the window-like apertures and can engage into the clamping strip in the region of the elevations to form the snap connection.

It can also be provided that the cover regions have at least in part screw tabs for screws for screwing the isolation strip to the clamping strip. In particular, the cover regions having the screw tabs have a Z-shaped profile, so that the screw tabs are in the form of Z-shaped tabs which are offset downward in the direction of the clamping strip. The screws for fastening the isolation strip and the fastening devices in the form of screws thereby have in particular different strength classes. For example, the screws for fastening the isolation strips can have a significantly lower strength than the fastening devices.

In a further development of the invention, the isolation strip has at least one positioning element for positioning the isolation strip on the clamping strip. The positioning element can be in the form of a hook, for example, which is arranged on at least one cover region, projects contrary to the vertical direction into one of the depressions in the clamping strip and thereby abuts a side wall defining the depression. In particular, at least two cover regions each have a positioning element, so that the isolation strip is secured against displacement in the longitudinal direction.

The embodiments presented in relation to the support device according to the invention and the advantages thereof apply correspondingly to the electrical energy store according to the invention.

Further features of the invention will become apparent from the claims, the figures and the description of the figures. The features and feature combinations mentioned hereinbefore in the description as well as the features and feature combinations mentioned hereinbelow in the description of the figures and/or shown only in the figures can be used not only in the combination described in each case but also in different combinations or on their own.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical elements and elements which have identical functions are provided with the same reference numerals.

DETAILED DESCRIPTION OF THE DRAWINGS

Figure 1:
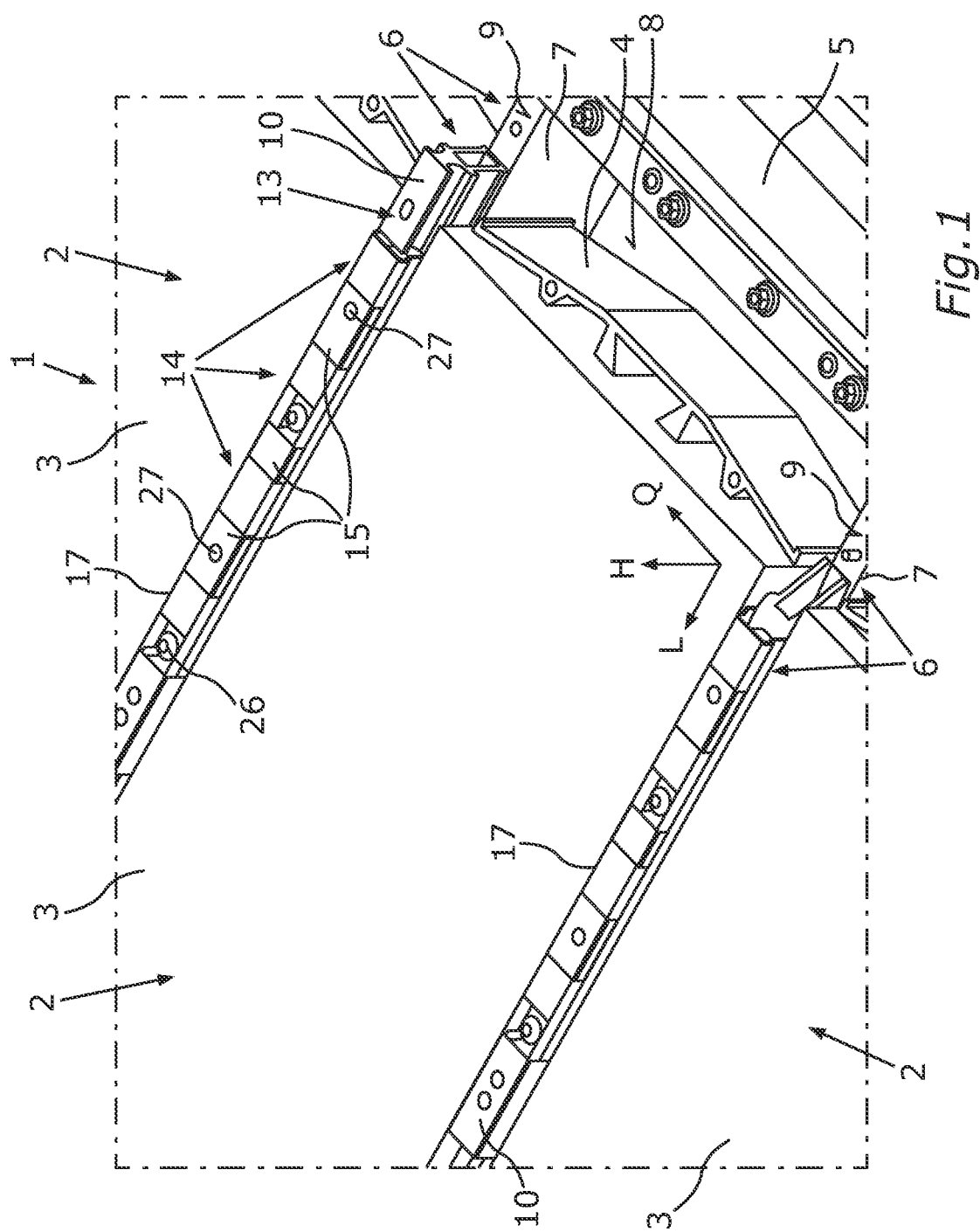
FIG. 1 is a schematic perspective view of a detail of an electrical energy store having a first variant of a support device.

FIG. 1 shows a detail of an electrical energy store 1 which forms, for example, a traction accumulator for an electrically drivable motor vehicle. The electrical energy store 1 has a plurality of storage modules 2, which are arranged side by side in a transverse direction Q. The storage modules 2 here each have a cell assembly 3 which is arranged in a cell module frame 4 of the storage module 2. The storage modules 2 are arranged in a storage housing 5 and are held therein by means of support devices 6, a first variant of which is shown in FIG. 1.

Figure 2:
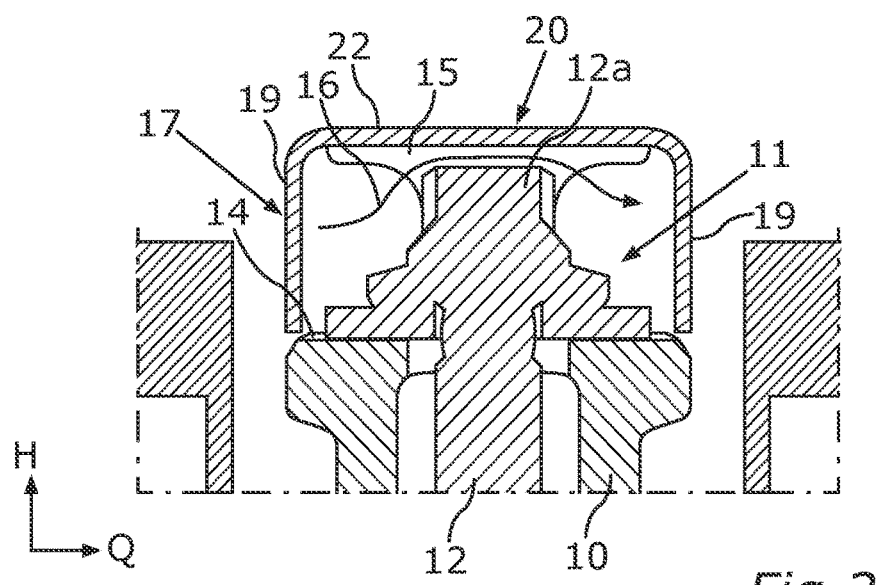
FIG. 2 is a first cross-sectional view through the electrical energy store according to FIG. 1 in the region of the support device.
Figure 3:
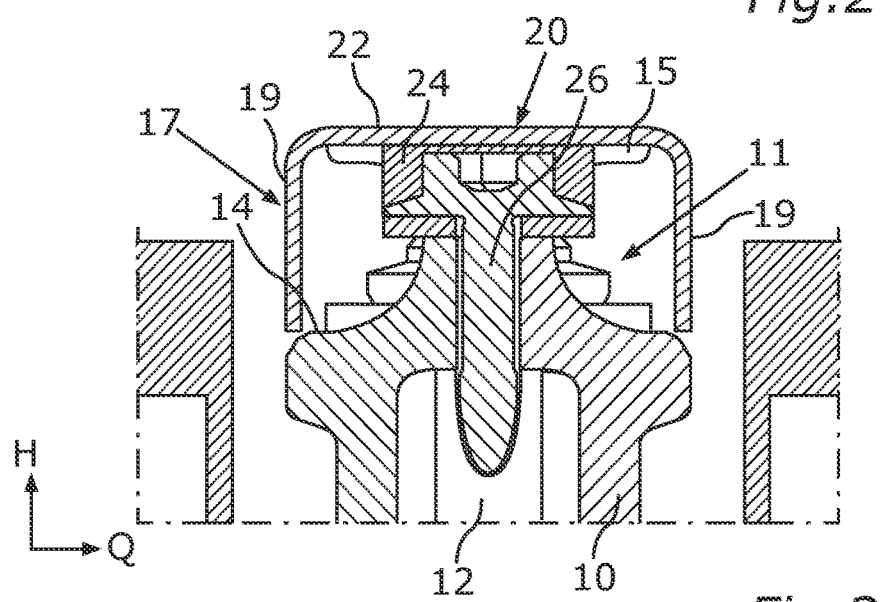
FIG. 3 is a second cross-sectional view through the electrical energy store according to FIG. 1 in the region of the support device.

The support devices 6 extend in a longitudinal direction L and comprise beams 7 which are fixed, for example welded, to a housing base 8 of the storage housing 5. A support device 6 is arranged in each case between at least two storage modules 2. The beams 7 have a bearing face 9 on which holding elements (not shown here) of the storage modules 2 can be placed. In order to be able to fasten the holding elements to the beams 7 and thus the storage modules 2 to the support devices 6, the support devices 6 additionally have clamping strips 10 which are arranged on the bearing face 9 of the respective beam 7 and are thus arranged above the beams 7 in the vertical direction H. In order to be able to clamp the holding elements between the respective bearing face 9 and the respective clamping strip 10, fastening devices 11 in the form of screws 12 (see cross-sectional views in FIG. 2 and FIG. 3 and longitudinal view in FIG. 4) are provided. The clamping strips 10 are here in the form of hollow profile elements. An upper side 13 of the clamping strip 10 has depressions 14 and elevations 15, wherein the fastening devices 11, in particular screw heads 12a of the screws 12, are arranged in the depressions 14.

Figure 4:
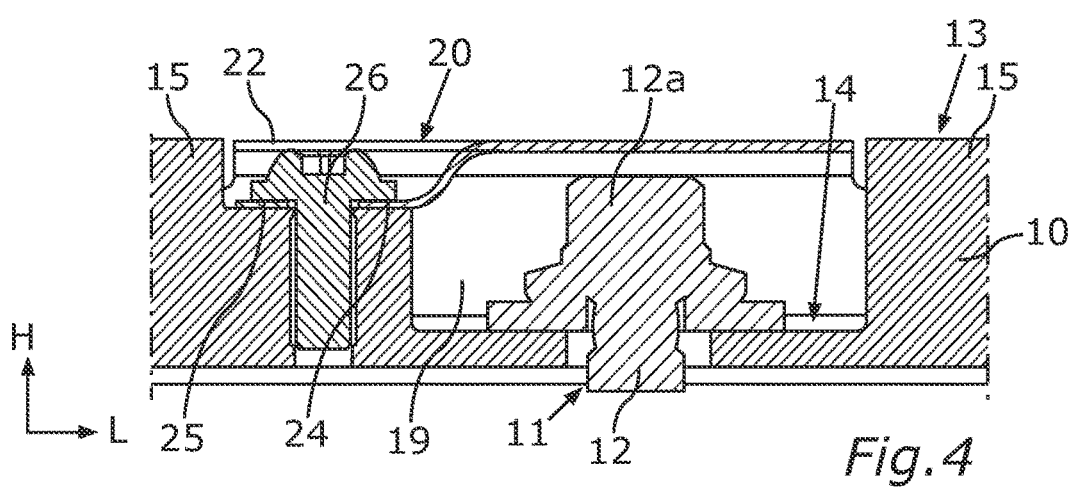
FIG. 4 is a longitudinal sectional view through the electrical energy store according to FIG. 1 in the region of the support device.
Figure 5:
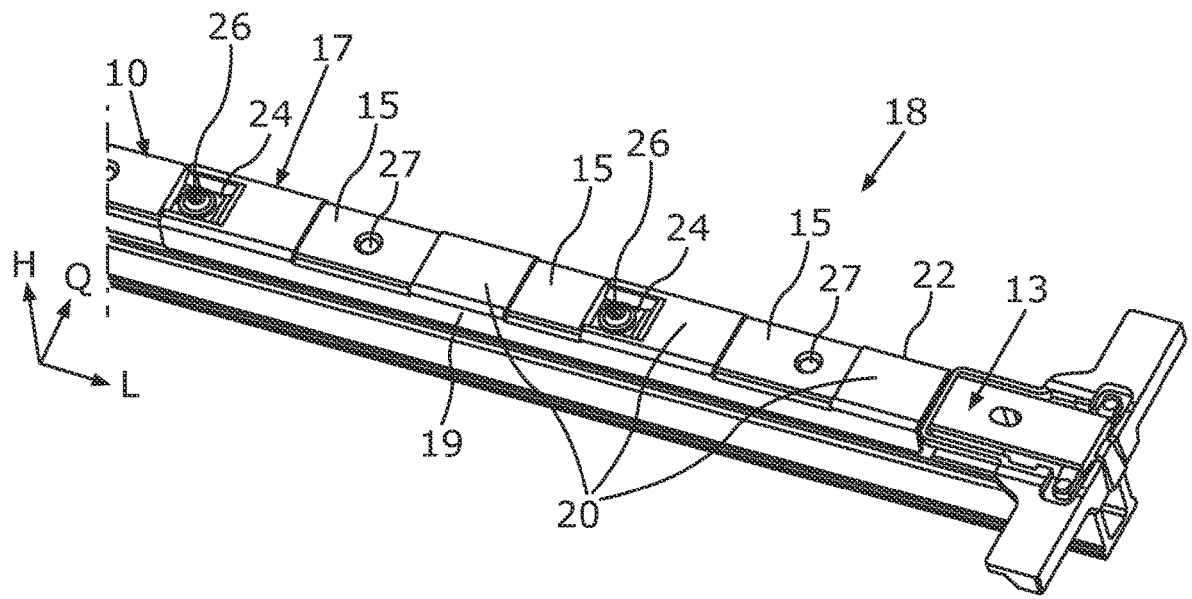
FIG. 5 is a schematic perspective view of an assembly having a clamping strip and an isolation strip according to the first variant of the support device.
Figure 6:
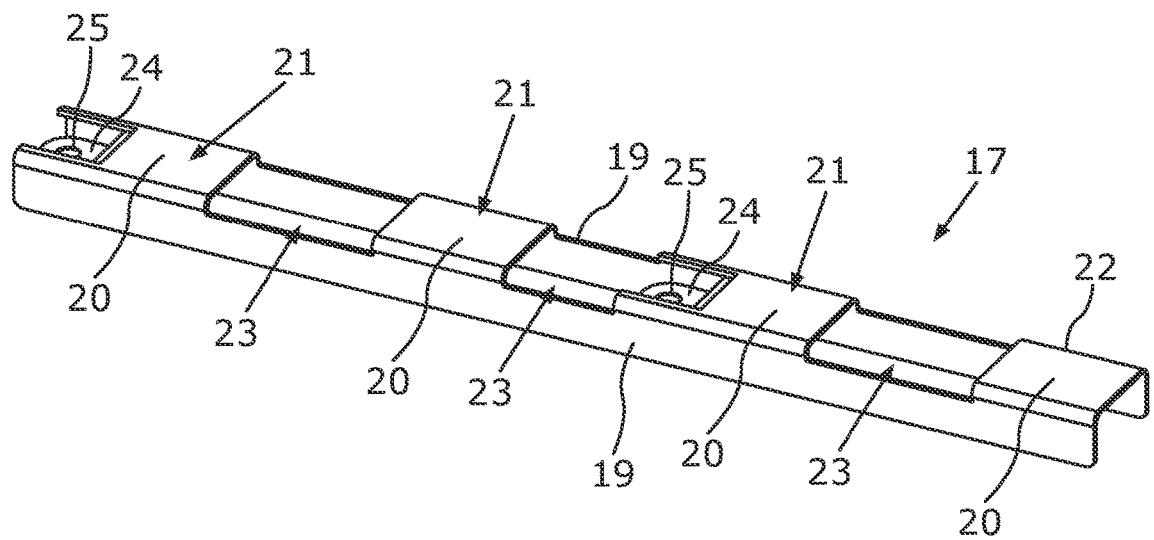
FIG. 6 is a schematic perspective view of the isolation strip according to FIG. 5.

The depressions 14 thereby form channels 16 which extend in the transverse direction Q and accordingly fluidically and thus thermally couple the storage module 2 arranged on one side of the support device 6 with the storage module 2 arranged on the other side of the support device 6. Thus, if one of the storage modules 2 emits heat and/or particles as a result of a thermal event, the heat and/or particles can pass through the support device 6 via the channels 16 to the other storage module 2 and, depending on the voltage difference, the surrounding installation space boundary conditions and other influencing factors, possibly likewise trigger a thermal event there. In order to prevent this, the support device 6 additionally has an isolation strip 17 which is arranged on the clamping strip 10. An assembly 18 formed by the clamping strip 10 and the isolation strip 17 of a first variant is shown in FIG. 4, the isolation strip 17 of the first variant is shown in FIG. 6. The isolation strip 17 serves to close the channels 16 formed in the clamping strip 10.

To this end, the isolation strip 17, which can be in the form of, for example, a stamped and bent sheet-metal part, has two side parts 19 which, here without interruption, extend in the longitudinal direction L, in particular over the entire length of the isolation strip 17. These side parts 19 cover the channels 16 at the sides. The isolation strip 17 additionally has cover regions 20 which cover the channels 16 at the top. The cover regions 20 are formed by portions 21 of a cover part 22 of the isolation strip 17 which are adjacent to window-like, for example punched-out, apertures 23 of the cover part 22. The elevations 15 of the clamping strip 10 are arranged in these window-like apertures 23.

The isolation strip 17 of the first variant additionally has screw tabs 24, which are here formed in two of the cover regions 20. The screw tabs 24 are thereby offset downward contrary to the vertical direction H, so that these cover regions 20 have a Z-shaped profile. The screw tabs 24 have a through-opening 25 for a screw 26 (see cross-sectional view in FIG. 4 and longitudinal view in FIG. 6), by means of which the isolation strip 17 is fastened to the clamping strip 10. As soon as the isolation strip 17 is arranged on the clamping strip 10 and thus the channels 16 are closed, the storage housing 5 can be closed by a housing cover (not shown here) such that the housing cover lies against the upper side 13 of the clamping strip 10 in the region of the elevations 15. To this end, the upper side 13 can have screw holes 27 via which the housing cover can be fixedly screwed to the support devices 6.

Figure 7:
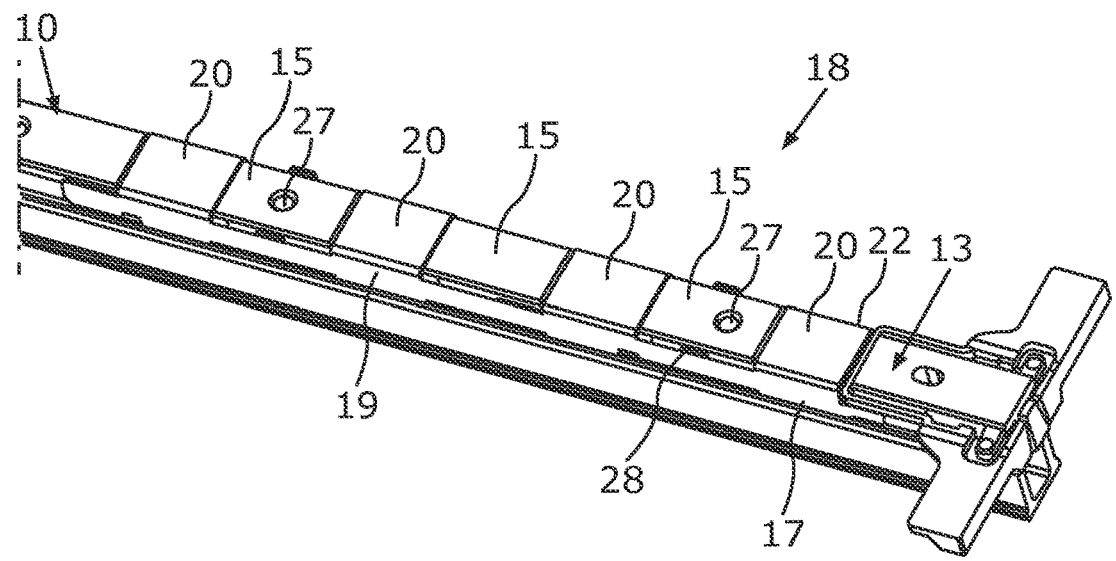
FIG. 7 is a schematic perspective view of an assembly having a clamping strip and an isolation strip according to a second variant of the support device.
Figure 8:
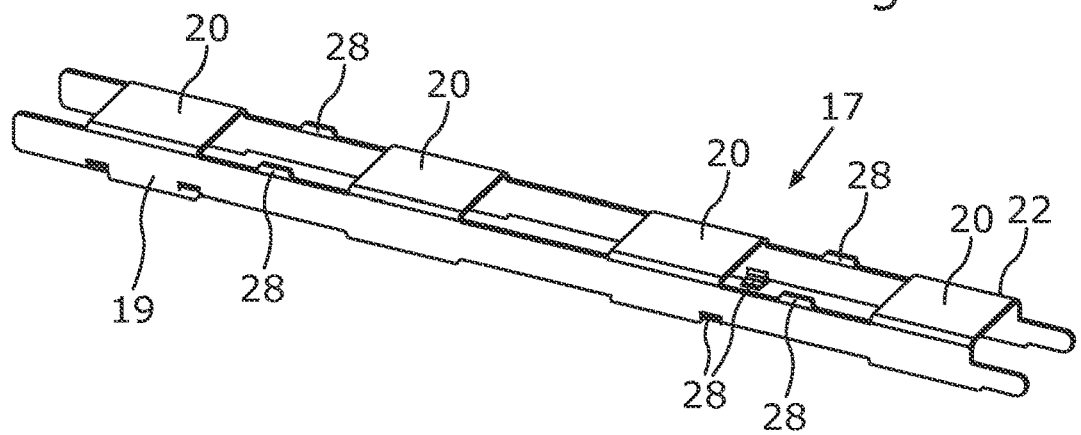
FIG. 8 is a schematic perspective view of the isolation strip according to FIG. 7.
Figure 9:
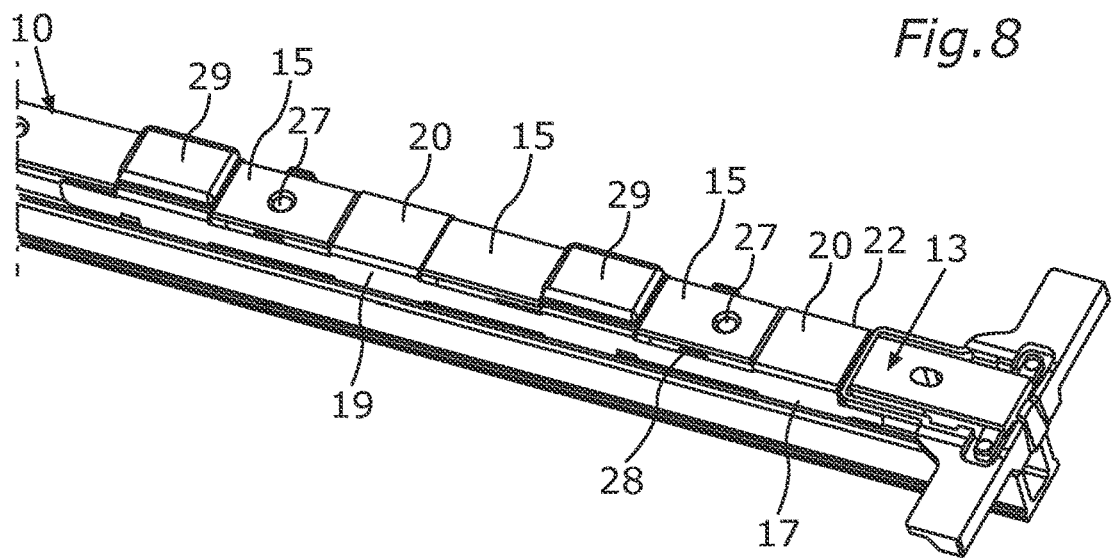
FIG. 9 is a schematic perspective view of an isolation strip according to a third variant of the support device.

FIG. 7 and FIG. 8 show a further variant of the isolation strip 17. The isolation strip 17 here has positioning elements 28 with which the isolation strip 17 can be positioned on the clamping strip 10. The positioning elements 28 are here formed in one piece with the side parts 19. In this variant, the isolation strip 17 is only placed on the clamping strip 10 and positioned by means of the positioning elements 28. In a further variant of the isolation strip 17 shown in FIG. 9, pressing pads 29 are arranged on the cover regions 20 of the isolation strip 17. When the housing cover is fitted, these pressing pads 29 are compressed and thus press the isolation strip 17 against the clamping strip 10.

Figure 10:
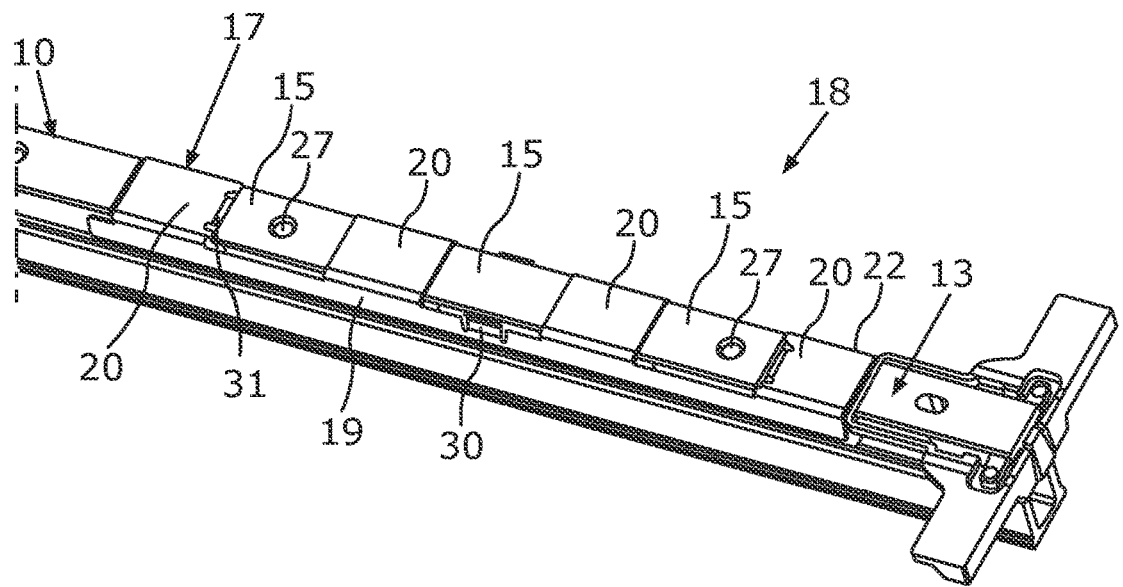
FIG. 10 is a schematic perspective view of an assembly having a clamping strip and an isolation strip according to a fourth variant of the support device.
Figure 11:
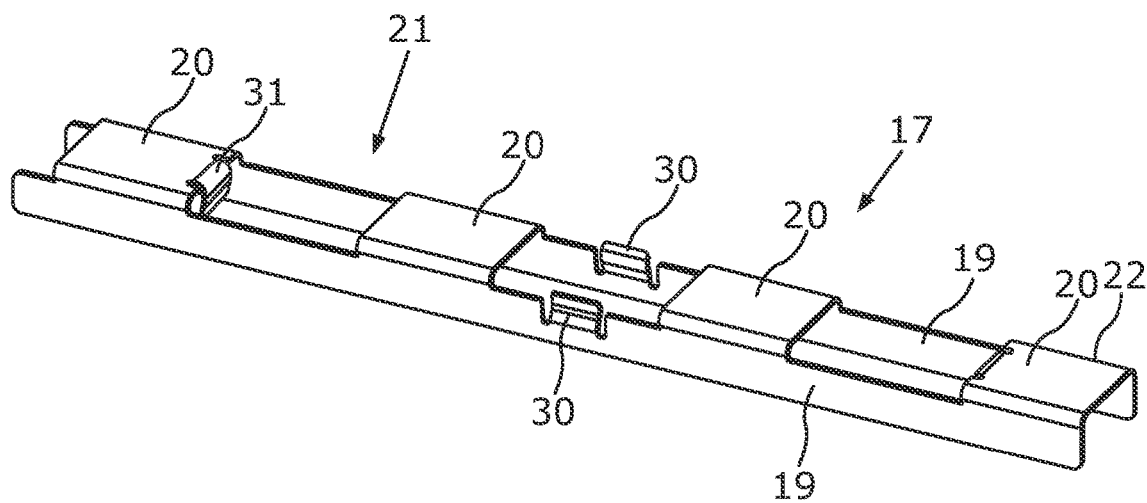
FIG. 11 is a schematic perspective view of the isolation strip according to FIG. 10.

In a further variant of the isolation strip 17 shown in FIG. 10 and FIG. 11, the isolation strip has snap hooks 30 which form a snap connection with the clamping strip 10. The snap hooks 30 are formed in one piece with the side parts 19 and can snap into notches in the clamping strip 10. The isolation strip 17 here additionally has positioning elements 31 which are formed in one piece with the cover part 22. The positioning elements 31 are here in the form of clips which project into the depressions 14 and are arranged so that they abut side walls of the elevations 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A support device for an electrical energy store for arrangement in a storage housing between at least two storage modules of the electrical energy store and for holding the at least two storage modules, which are fastenable to both sides of the support device in a transverse direction, in the storage housing, comprising:
    a beam for fastening to the storage housing, the beam having a bearing face on which holding elements of the storages module are to be placed;
    a clamping strip for arrangement on the bearing face of the beam and for clamping the holding elements of the storage modules;
    fasteners for fastening the clamping strip to the beam, wherein, in an upper side of the clamping strip, depressions are arranged spaced apart from one another in a longitudinal direction of the support device, which depressions are configured to receive the fasteners, wherein the depressions form continuous channels in the transverse direction; and
    an isolation strip which is to be arranged on an upper side of the clamping strip and which is configured to close the channels in order to prevent a thermal event of one storage module from being transmitted to another storage module located opposite in the transverse direction, the isolation strip having two side parts, which extend in the longitudinal direction and cover the depressions at the sides, and cover regions, which cover the depressions on the upper side.

2. The support device according to claim 1, wherein the side parts of the isolation strip are strip-shaped, and a cover part of the isolation strip has in the longitudinal direction window-shaped apertures for arrangement on the upper side of the clamping strip remote from the depressions,
    wherein portions of the cover part that are adjacent to the apertures form the cover regions for covering the channels on the upper side.

3. The support device according to claim 1, wherein the isolation strip is a stamped and bent sheet-metal part.

4. The support device according to claim 1, wherein in a state in which the isolation strip is arranged on the clamping strip, a height of the cover regions is less than a height of the upper side of the clamping strip remote from the depressions.

5. The support device according to claim 1, wherein the isolation strip has snap hooks that form a snap connection with the clamping strip.

6. The support device according to claim 1, further comprising:
    pressing pads that press the isolation strip against the clamping strip to form a force-based connection, the pressing pads being arranged at least in part on the cover regions of the isolation strip.

7. The support device according to claim 1, wherein the cover regions have at least in part screw tabs for screws for screwing the isolation strip to the clamping strip.

8. The support device according to claim 7, wherein the cover regions having the screw tabs have a Z-shaped profile, so that the screw tabs are in the form of Z-shaped tabs which are offset downward in the direction of the clamping strip.

9. The support device according to claim 1, wherein the isolation strip has at least one positioning element for positioning the isolation strip on the clamping strip.

10. An electrical energy store for a motor vehicle, comprising:
    a storage housing having a housing base and a housing cover;
    at least two storage modules, wherein each storage module has at least one holding element;
    at least one support device according to claim 1, wherein the at least two storage modules are arranged next to the support device on both sides in the transverse direction of the support device,
    the holding elements of the storage modules are clamped between the beam and the clamping strip, and
    the beam is fastened to the housing base of the storage housing and the housing cover is arranged so that it lies against the upper side of the clamping strip in the region remote from the depressions.

* * * * *